United States Patent
Ricciardi, Sr. et al.

(10) Patent No.: US 8,800,825 B2
(45) Date of Patent: Aug. 12, 2014

(54) METERING MECHANISM FOR STRAND-TYPE BULK SOLID MATERIALS

(75) Inventors: Ronald J Ricciardi, Sr., Woodcliff Lake, NJ (US); Paul Matarazzo, Oakland, NJ (US); Marc S. Landry, Vernon, NJ (US)

(73) Assignee: Acrison, Inc., Moonachie, NJ (US)

( * ) Notice: Subject to any disclaimer, the term of this patent is extended or adjusted under 35 U.S.C. 154(b) by 1507 days.

(21) Appl. No.: 11/843,136

(22) Filed: Aug. 22, 2007

(65) Prior Publication Data

US 2009/0050654 A1    Feb. 26, 2009

(51) Int. Cl.
G01F 11/20  (2006.01)
G01F 13/00  (2006.01)
G01G 11/10  (2006.01)
G01G 11/08  (2006.01)

(52) U.S. Cl.
CPC ........... G01F 13/003 (2013.01); G01G 11/10 (2013.01); G01G 11/086 (2013.01)
USPC ........... 222/415; 222/55; 222/342; 414/518; 414/519; 414/528

(58) Field of Classification Search
CPC .................... G01F 13/003; G01G 11/086
USPC ........... 222/55, 163, 415, 342; 414/518, 519, 414/527, 528; 239/672, 676, 677, 679, 680
See application file for complete search history.

(56) References Cited

U.S. PATENT DOCUMENTS

| | | | | |
|---|---|---|---|---|
| 2,202,858 A | * | 6/1940 | Johnson | 222/80 |
| 2,756,459 A | * | 7/1956 | Kellner | 425/93 |
| 3,072,293 A | * | 1/1963 | Greten | 222/55 |
| 3,078,019 A | * | 2/1963 | Bacon | 222/310 |
| 3,587,933 A | * | 6/1971 | Regnier et al. | 222/610 |
| 3,825,152 A | * | 7/1974 | Davis et al. | 222/1 |
| 3,939,929 A | | 2/1976 | Hidaka et al. | |
| 4,044,921 A | * | 8/1977 | Caverly | 222/74 |
| 4,436,226 A | * | 3/1984 | Aggen | 222/280 |
| 4,847,022 A | | 7/1989 | Bold | |
| 5,095,961 A | | 3/1992 | Nakagawa | |
| 5,833,092 A | | 11/1998 | Godfrey et al. | |

* cited by examiner

Primary Examiner — J. Casimer Jacyna
(74) Attorney, Agent, or Firm — Fish & Richardson P.C.

(57) ABSTRACT

A system and method are disclosed that provide a specific volumetric output (e.g., product feed and discharge) of a material. In some implementations, these systems and methods are particularly suited for use with strand-type materials, namely, materials having difficult handling characteristics. For some implementations, a specific pile depth and width of a material is created on a moving belt to provide a specific volumetric output based on the speed of the belt. One or more leveling drums can be used to make the pile depth consistent. Moreover, a weighing system can be provided that is used in combination with the metering mechanism and other components (e.g., a control system) to create a "weight-loss" type weigh feeder.

27 Claims, 4 Drawing Sheets

-METERING MECHANISM (101)

—METERING MECHANISM (101)

—METERING MECHANISM (101)

METERING MECHANISM FOR STRAND-TYPE BULK SOLID MATERIALS

TECHNICAL FIELD

This disclosure relates to a metering mechanism for strand-type bulk solid materials.

BACKGROUND

The precise metering of materials (e.g., dry solids) is very important in many applications, particularly in the manufacturing processes of the numerous processing industries. Usually when such materials are continuously metered into such processes, they must be precisely controlled at specific feed rates so that the processes function as designed, that product formulation is correct, and that the quality of the end product does not suffer. Many of these applications are automated, and productivity demands that they proceed without human intervention to the greatest extent possible.

On a global basis, a number of different types of feeders are utilized for metering the many thousands of different dry solid materials that are regularly used by manufacturers in their various processes. Such materials can be in the form of granules, powders, flakes, chunks, strands, and can be foodstuffs, plastics, chemicals, pharmaceuticals, ceramics, etc., with each possessing its own individual physical handling characteristics. In general, material is provided to a feeder continuously or periodically from storage supply and the feeder discharges the material at a desired output rate. Different feeders, however, have different capabilities, which depend on the design of the individual feeders and their principles of operation.

Feeding mechanisms, especially when feeding adhesive, cohesive, fibrous, or hygroscopic dry solids materials, sometimes experience problems in handling the material due to the material either sticking to the walls of a supply hopper blocking downward flow, or bridging of the material in the feeding mechanism itself and/or the supply hopper supplying material to the feeder (e.g., compaction due to the adhesive, cohesive and/or compressible nature of the material).

SUMMARY

In an aspect of the invention, a system and method are disclosed that provide a specific volumetric output (e.g., product feed and discharge) of a material. In some implementations, these systems and methods are particularly suited for use with strand-type materials, namely, materials having difficult handling characteristics. For some implementations, a specific pile depth and width of a material is created on a moving belt to provide a specific volumetric output based on the speed of the belt. One or more leveling drums can be used to make the pile depth consistent. Moreover, a weighing system can be provided that is used in combination with the metering mechanism and other components (e.g., a control system) to create a "weight-loss" type weigh feeder.

The details of one or more implementations are set forth in the accompanying drawings and the description below. Various features and advantages will be apparent from the description and drawings, and from the claims.

Figure 1A:
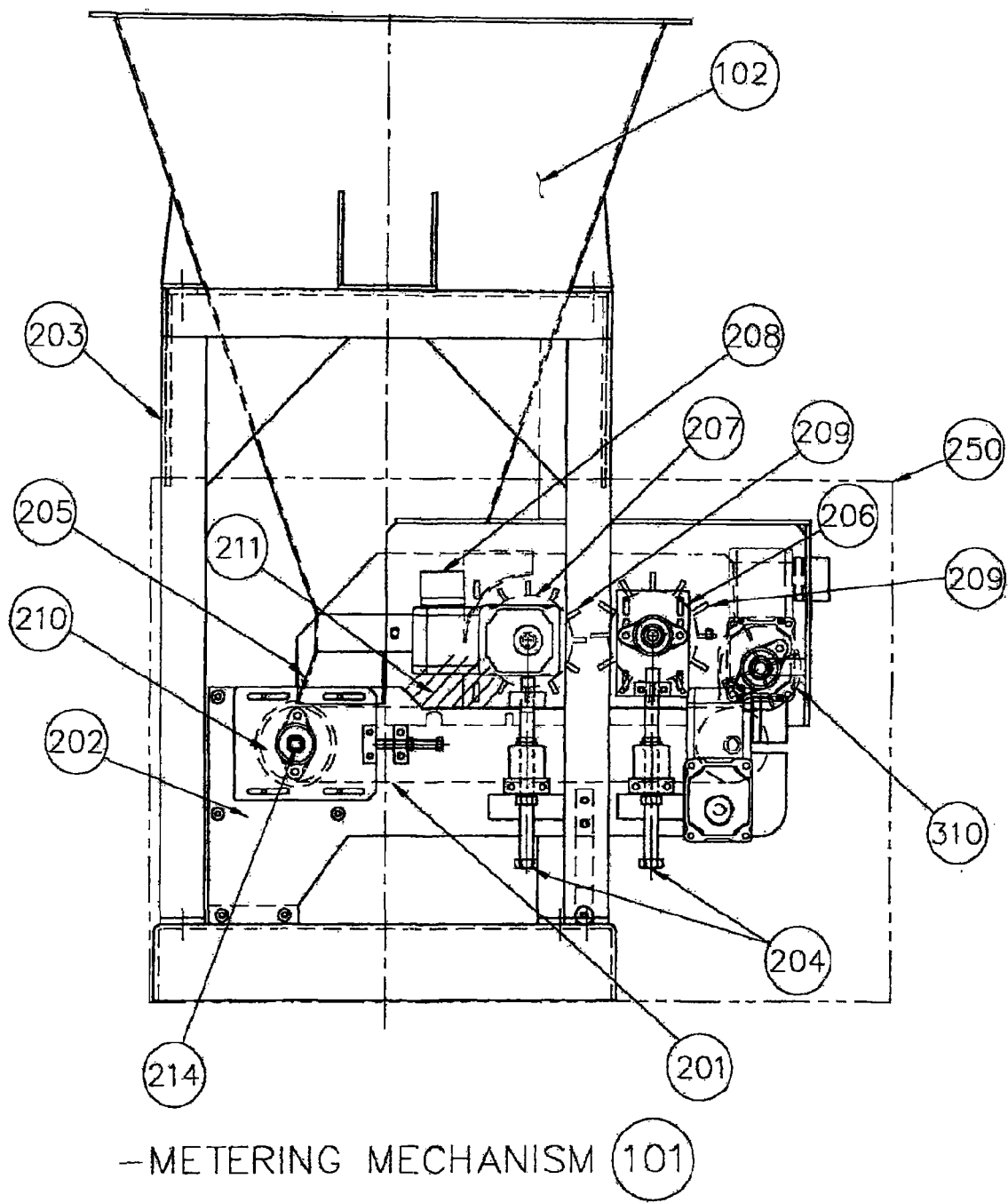
FIG. 1A is a first view of an implementation of a feeding mechanism for strand-type materials with an integral hopper.

The figures are not drawn to scale.

DETAILED DESCRIPTION

The following is a description of preferred implementations, as well as some alternative implementations, of a metering mechanism for materials.

Users who require feeding "strand"-type materials (e.g., strands, fibrous, or any strand-type material that tends to clump, interlock, attach or otherwise exhibit poor metering and flowability characteristics) into their processes have historically found this to be challenging, whether the requirement is for metering by volume (volumetric metering) or by weight (weigh feeding). For fibrous or strand-type materials, the problem is generally more pronounced when the "strands" have a length of about 0.5 to 1 inch or more, such as those commonly encountered with the requirement to meter certain types of fiberglass. This problem stems from the typically difficult handling characteristics of such materials, making most commercially available dry solids feeding/metering mechanisms ineffective, unreliable and/or inaccurate.

In addition, users who require that "strand-type" materials be accurately metered into their processes also require that the discharging feed stream be relatively smooth which, due to the nature of such materials, presents an additional challenge. Generally, such materials do not flow very well because of the tendency to interlock and/or form clumps that make metering difficult and sporadic, especially when product flow is channeled through converging or restrictive orifices or outlets, typical of various types of metering devices, especially when metering at feed rates below 50 or 100 pounds per hour. For example, in the case of fibrous or "strand-type" materials, strands tend to interlock with each other that make accurate metering and smoothness of flow difficult at best.

Overview

An implementation of a feeding mechanism suited for feeding strand-type materials operates on the principle of volumetric displacement, achieved by maintaining a specific pile depth and width of material on a variable speed belt, thereby providing a specific volumetric output (e.g., product discharge) over a given period of time, based on the speed of the belt. Producing a consistent, non-agglomerated material pile depth on the belt can result in good volumetric metering performance and operational dependability. Weigh feeder performance can be obtained by, e.g., utilizing such a device as the metering mechanism of a weigh feeder (e.g., an Acrison, Inc. "Weight-Loss" Weigh Feeder).

Various implementations can be used, for example, to handle fibrous or strand-type materials having strand lengths of less than 0.125 inches to 1.5 inches or more.

Such a metering mechanism can be made in various sizes to accommodate a wide range of feed rates. For example, a feeder with a belt having a useable width of approximately 12 inches can produce feed rates as low as about 20 pounds per hour upwards to about 2000 pounds per hour. Narrower or wider belts can result in correspondingly smaller or larger feed rates, respectively. Some implementations create a specific pile depth and width of material by using one or more rotating drums. In those implementations, it is sometimes preferred that the useable width of the belt is about the same as the effective width of one or more of the rotating drums. In practice, this can result in the belt and drum having about the same overall width.

Implementations of a Feeder Mechanism

FIG. 1A is a view of a metering mechanism 101 with its supply hopper 102 for feeding strand-type materials. Material supply to the metering belt 201 is stored in hopper 102 mounted above the rear end of the metering belt 201 (e.g., an endless belt). The angle at which the hopper 102 tapers is chosen, in some implementations, to avoid bridging of the material. The hopper 102 and metering belt 201 are kept in substantially operational alignment by, among other things, support frame 203 and chassis 202. The metering belt 201 is powered by a variable speed belt gearmotor (see FIGS. 2A and 2B, item 306). In some implementations, the belt gearmotor operates at a very slow speed. Note that the gearmotors mentioned throughout this disclosure can be AC or DC, induction or synchronous, commutated or brushless, and/or could take the form of a stepper motor. Moreover, they may include reduction gear assemblies (e.g., to increase applied torque) or may be direct-driven. The gearmotors may be driven or controlled by, e.g., a variable speed motor controller such as the Acrison, Inc. 060 or 040 SCR/DC motor controllers, or by commercially available DC or AC variable speed motor controllers.

A hopper discharge spout 205 directs material flow out of the feeder's integral supply hopper 102 and onto the back end of the metering belt 201. The top half of the metering belt 201 travels from left to right, i.e., the rear pulley 210 rotates in a clockwise direction (the front pulley is not visible in this view (see FIGS. 2A and 2B, item 311), but it rotates in the same direction as the rear pulley 210). Note, however, that the feeder 101 can be reconfigured such that material from the hopper 102 is discharged onto the metering belt 201 and moves from right to left. This reconfiguration could involve, e.g., reverse-mounting the feeder 101 relative to other elements of a system.

Material from the feeder's supply hopper 102 is deposited onto the metering belt 201 in a manner that substantially avoids spilling material off the back and/or sides of the metering belt 201. In this implementation, the terminus of the hopper discharge spout 205 is disposed in close proximity to the metering belt 201. This small gap aids in keeping the material contained. Although not visible in this view, the back end of the hopper discharge spout 205 (i.e., the left side in this view of this implementation) is substantially solid to prevent spillage whereas the front end of the hopper discharge spout 205 (i.e., the right side in this view of this implementation) is substantially open to allow unrestricted flow of the material in the hopper 102 onto the metering belt 201. Possible cross-sections for the hopper discharge spout include a half-circle (e.g., "C" shaped) or an open triangle (e.g., "V" shaped). Also, mounted on the chassis are side guides (see FIGS. 2A and 2B, item 301) that maintain the desired width of material on the belt 201 and prevent material from flowing off either side of the metering belt 201.

Mounted on the feeder chassis 202, directly above the metering belt 201, are two pile depth (spiked) leveling drums (front 206 and rear 207). As shown, the drums 206 and 207 are spaced apart disposed above and oriented across and parallel to the upper surface of the belt 201. In some implementations, front and rear drums 206 and 207 are mechanically connected together and driven by a single gearmotor 208. In some implementations, the gearmotor 208 rotates drums 206 and 207 at a speed proportional to the speed of the metering belt 201. Although it may vary depending upon the implementation, from this perspective, rear drum 207 and front drum 206 rotate in the same clockwise direction. As material flows out of the supply hopper 102 and onto the belt, the solid diameter of the rotating rear leveling drum 207 controls the pile depth of material that is conveyed forward (i.e., rightward in this view of this implementation). The rear leveling drum 207 also controls material that it catches in the leveling spikes 209 and partially directs it backward toward the hopper discharge spout 205. Put another way, excess material is contained and maintained within the reservoir (e.g., the shaded area 211) of the hopper discharge spout 205 by the rotational action of the "spiked" rear leveling drum 207, which also partially restricts forward movement of excess material on the metering belt 201. The action of the front leveling drum 206 further levels the height of material being conveyed forward by the belt 201, such that as the material reaches the discharge point of the belt, its pile depth across the width of the belt 201 is substantially consistent and uniform. Some implementations may omit the front leveling drum 206.

The leveling drums 206 and 207 include "spikes" 209 distributed on their outside diameters that, in conjunction with the leveling drums, assist in controlling the height of material on the belt 201, but also, substantially eliminate the possibility of interlocking and/or clumping of material on the belt 201 as it is conveyed forward and off the belt. The leveling spikes 209 may be disposed in a variety of patterns and at different densities depending on, e.g., the characteristics of the material(s) to be processed. The leveling spikes 209 typically have a preselected length, but each leveling spike 209 need not have the same length, and can vary in length depending upon application parameters and material physical characteristics. One possible material for constricting the spikes 209 is stainless steel. Ceramics, mild steel, and plastics are usable as well in some implementations.

Generally, the amount of material that the leveling drums 206 and 207 and their spikes 209 handle and control depends on how close they (and their spikes 209) are to the surface of the metering belt 201, the rotational speed of the leveling drums 206 and 207, and the speed of belt 201. In some implementations, it is the distance between the upper surface of the belt and the drum (and more particularly, the distance between the upper surface of the belt and the closest line tangent to the diameter of the drum) that substantially determines the maximum height of material that will be allowed to pass. In some implementations, the distance from the upper surface of the belt to the outermost portion (end tip) of a spike which is substantially perpendicular to and adjacent to the upper surface of the belt aids in maintaining the depth of material on the belt. At any given time, more than one spike may be substantially perpendicular and adjacent to the upper surface of the belt. It is also possible at any given time for there to be no spikes that are substantially perpendicular and adjacent to the upper surface of the belt. "Adjacent" may be used to distinguish between spikes that are nearer to the belt as compared to those that are on opposite sides of the circumference of the drum (e.g., 206 and 207).

The heights of the front and rear leveling drums 206 and 207 (and their spikes 209) relative to the metering belt 201 are adjusted by the drum height adjustment mechanism 204. The adjustment mechanism 204 can take the form of a rotating threaded shaft (e.g., a screw) as shown. Rotation of the threaded shafts 204 causes the drums 206 and 207 (and spikes 209) to become closer or further away from the metering belt 201. The height of the front and rear drums 206 and 207 relative to the metering belt 201 may be the same or may differ. The closer that the leveling drums 206 and 207 and their spikes 209 are to the metering belt 201, the lower the maximum volumetric flow rate will be, due to lower material height on the metering belt 201 and its related volumetric capacity. The further leveling drums 206 and 207 and their spikes 209 are from the metering belt 201, the greater the maximum volumetric flow rate, due to a higher material height on the belt 201. Depending upon the implementation, the distance the spikes 209 and/or drums 206 and 207 are above the metering belt 201 is determined by product characteristics and feed rate requirements. In some implementations, such adjustment would allow the leveling spikes 209 to be anywhere between (and including) about 0.12 to 1.5 inches above the metering belt 201. This height can be adjusted manually, e.g., by having an operator adjust threaded shafts 204.

As mentioned, the height of the drums 206 and 207 is related to the maximum volumetric flow rate. The drums 206 and 207 create a certain pile depth of material, and moreover, the material will maintain a certain width on the belt 201 (see FIG. 2A, items 308 and 309) based on the distance established by belt side guides 301. The volumetric flow rate is related to the speed of the metering belt 201 combined with the width of the material on the belt 201, controlled by side belt guides 301. To control the volumetric flow rate, the speed of the metering belt 201 is varied, along with the speed of the leveling drums 206 and 206, which speed may be electrically slaved to the speed of the metering belt 201. A sensor 214, which can take the form of a tachometer integral to either the belt gearmotor drive 208 or belt pulley (e.g., 210), can monitor the speed of the metering belt. Alternatively, the back EMF of the motor that drives the belt (e.g., item 306 of FIGS. 2A and 2B) can be detected (e.g., by reading the voltage generated by the motor between voltage pulses of a pulse-driven motor).

By using the combination of the front and rear pile depth spiked leveling drums (206 and 207, respectively), a substantially consistent pile depth on the metering belt 201 can be achieved. In some implementations, the front pile depth spiked leveling drum 206 would normally rotate at a faster speed (e.g., 2 to 3 times faster) than the rear pile depth leveling drum 207. Both the front and rear drums 206 and 207, respectively, are in some implementations designed and operated at speeds that will not degrade the material being metered. For example, excessive drum speed may damage certain materials and certain drum materials may react with or otherwise damage certain materials. Also, the drums 206 or 207 can themselves be damaged by abrasive materials. Accordingly, one possible drum and spike material is stainless steel. Ceramics, mild steel, aluminum and plastics are usable as well.

Figure 1B:
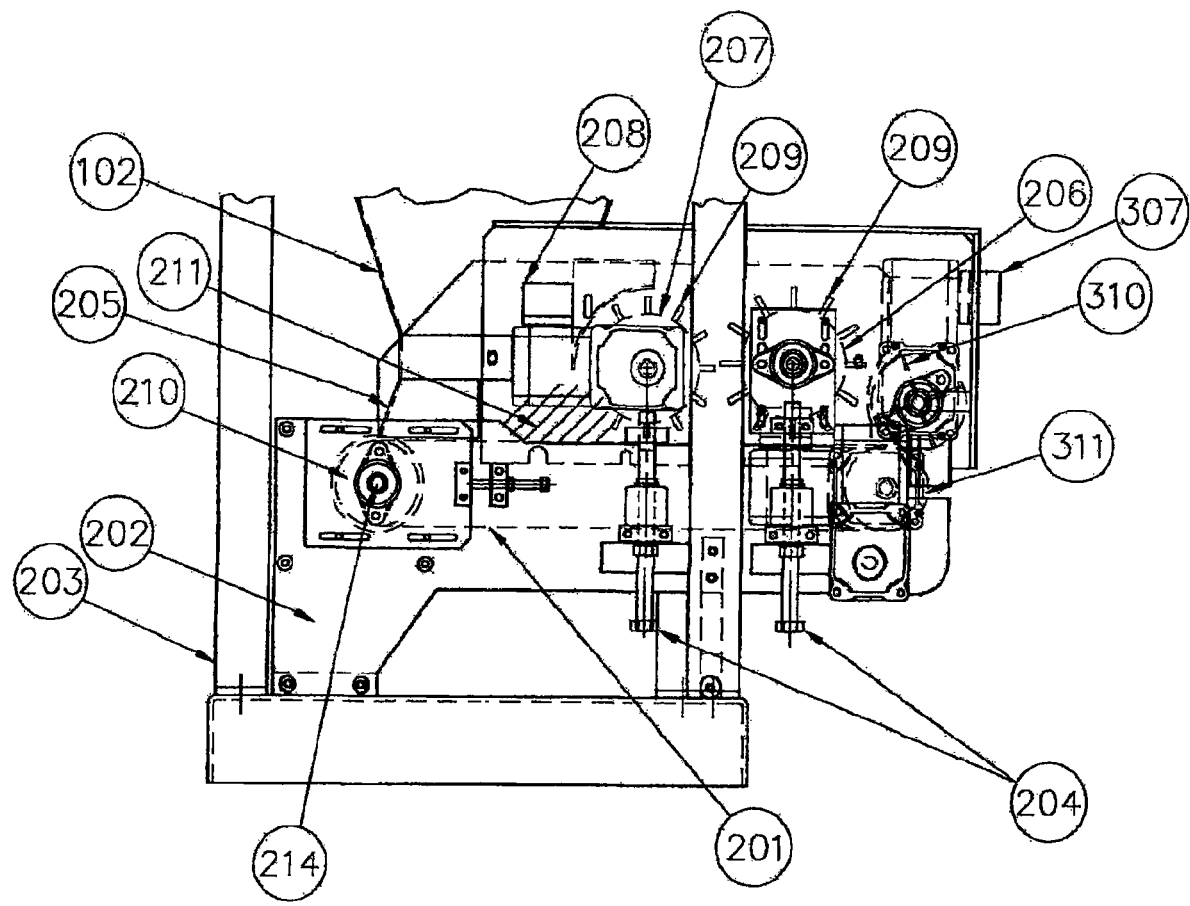
FIG. 1B is a close up view of the region 250 of FIG. 1A.

FIG. 1B is a close-up view of the region generally identified by item 250 in FIG. 1A.

Figure 2A:
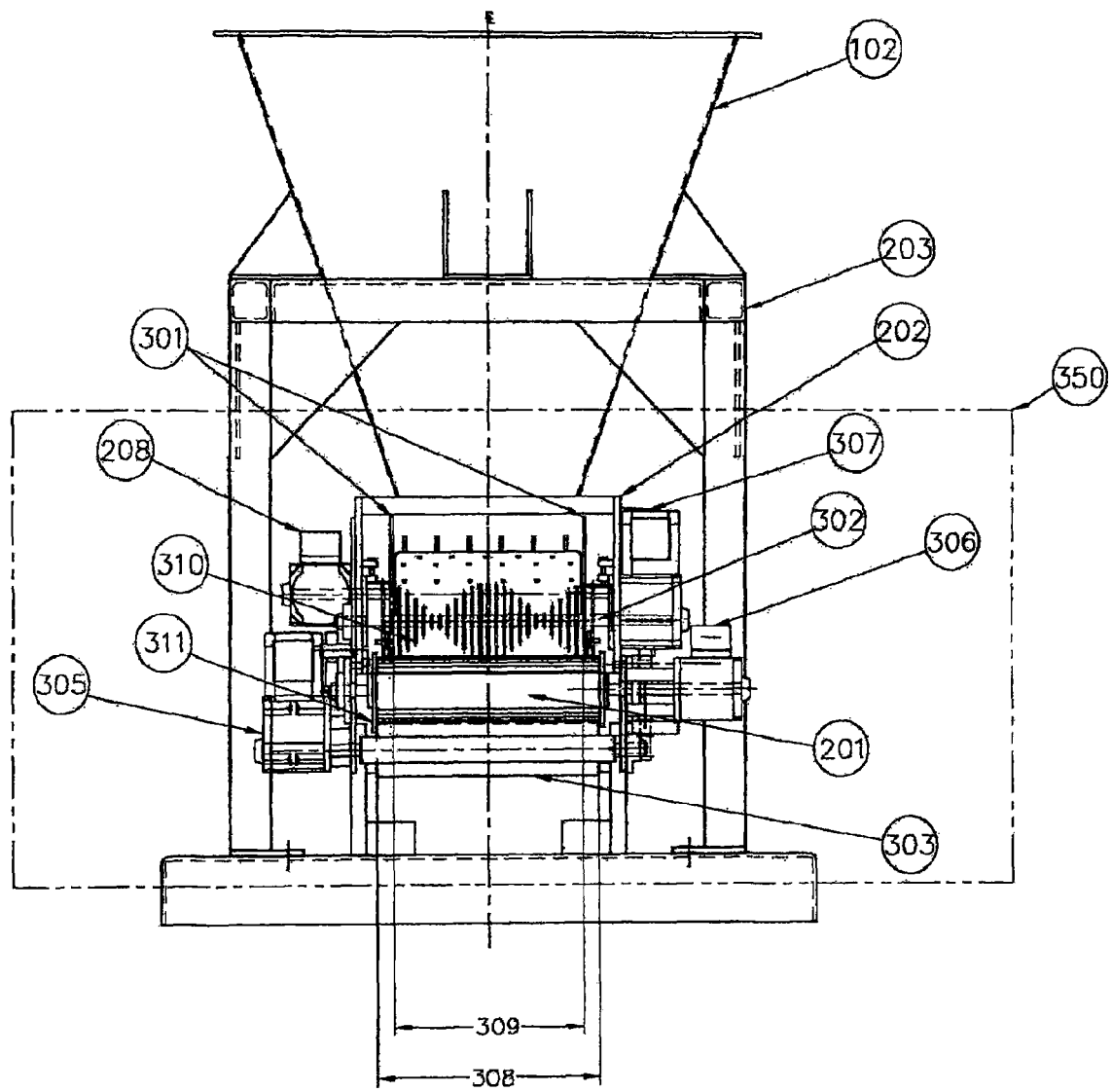
FIG. 2A is a second view from the perspective of the region 250 of FIG. 1A of an implementation of a feeding mechanism for strand-type materials and an integral supply hopper.

FIG. 2A depicts an alternate view of the feeding mechanism 101, wherein the mechanism 101 is viewed from the perspective 350 of FIG. 1A. Visible in this orientation are side guides 301 that maintain the desired width of material on the metering belt 201 and prevent material from spilling off the sides of the metering belt 201. Material on the belt 201 flows substantially directly against the side guides 301, which in conjunction with the depth of material on the belt 201, produces a given volumetric output based on the speed of the belt 201. Thus, both the minimum and maximum volumetric flow rates are directly related to the width of the belt 201, material depth on the belt, and belt speed. Although not visible in this view, the width of drums 206 and 207 is preferred, in most implementations, to be at least about as wide as the dimension 309, i.e., the dimension between both side guides 301 in order to ensure that the volumetric displacement parameter associated with the width of material on the belt 201 is satisfied.

The metering belt 201 is driven by belt gearmotor 306. The belt gearmotor 306 is preferred, in some implementations, to be a variable speed drive. Thus, varying the speed of the belt gearmotor 306 at a fixed pile depth and width allows varying the volumetric flow rate. Note, of course, that the pile depth is adjustable (see, e.g., FIGS. 1A and 1B, item 204).

To smooth-out and produce a more uniform flow of material as it begins to flow off the metering belt 201, a rotating flow smoothing picker 302 is mounted onto the chassis 202 at the discharge end of the metering belt 201 (i.e., at about the rightmost end of the metering belt 201 in FIG. 1A and as shown in FIG. 2A). The flow smoothing picker 302 includes a rotating shaft (e.g., a type of rotating drum). From the perspective of FIG. 1A or 1B, the picker 302 rotates in a counter-clockwise direction. This, however, may vary depending upon the implementation. In some implementations, the smoothing picker 302 operates independently at a constant speed, powered by its own gearmotor 307. In other implementations, the picker 302 can be driven by another gearmotor (e.g., via a belt or chain). The pickers 310 of the flow smoothing picker 302 create a more uniform flow of material off of the belt 201 by "picking" (or dispersing/breaking up) the material just as it reaches the very end of the metering belt 201 and begins to fall off the belt, i.e., just as the portion of the belt beneath the material begins to travel around the front pulley 311.

Depending on the implementation, the pickers 310 of the flow smoothing picker 302 rotate relatively close to the metering belt 201, e.g., about and including between 0.125 and 0.5 inches from the surface of the belt. This height may be adjusted by picker height adjusters 312 and 313. These adjusters 312 and 313 include a threaded shaft (as shown), that as it is rotated, adjusts the height of the flow smoothing picker 302.

In some implementations, the configuration and construction of the pickers 310 is similar to that of the leveling spikes 209 of leveling drums 206 and 207. In other implementations, the pickers 310 of the flow smoothing picker 302 may be in a spiraling configuration directed toward the center of the metering belt 201. In some implementations, the distribution of pickers 310 is uniform about the rotating shaft of the picker 302. The distribution of pickers 310 may vary depending on the material type.

Also, mounted beneath the metering belt 201, near the discharge end, is a wiper assembly 303, which in some implementations comprises three flexible synthetic wiper blades that make gentle contact with the surface of the belt 201. The wiper assembly 303 is mounted to the chassis 202, and rotates against the metering belt 201 to remove any residual material that may remain thereon. From the perspective of FIG. 1A, the wiper 303 rotates clockwise. This may vary depending upon the implementation, e.g., the wiper 303 may rotate counterclockwise. The wiper 303 may just barely touch the metering belt 201, or it may be oriented such that it applies somewhat more pressure to the metering belt 201. The amount of pressure can depend on the implementation and how the material may tend to cling/adhere to the metering belt 201 (note that in some implementations, the metering belt 201 is designed such that it resists material adherence—possible belt materials could include, e.g., neoprene, Teflon, polyethylene, and/or polyester). The wiper assembly 303 may be driven independently by a gearmotor 305. Alternatively, the wiper assembly 303 may share a motor with another element of the device, e.g., driven via a belt or chain. Depending on the implementation, the wiper assembly may be rotated at a constant, but relatively slow speed, generally in the range of 30 to 100 RPM.

Figure 2B:
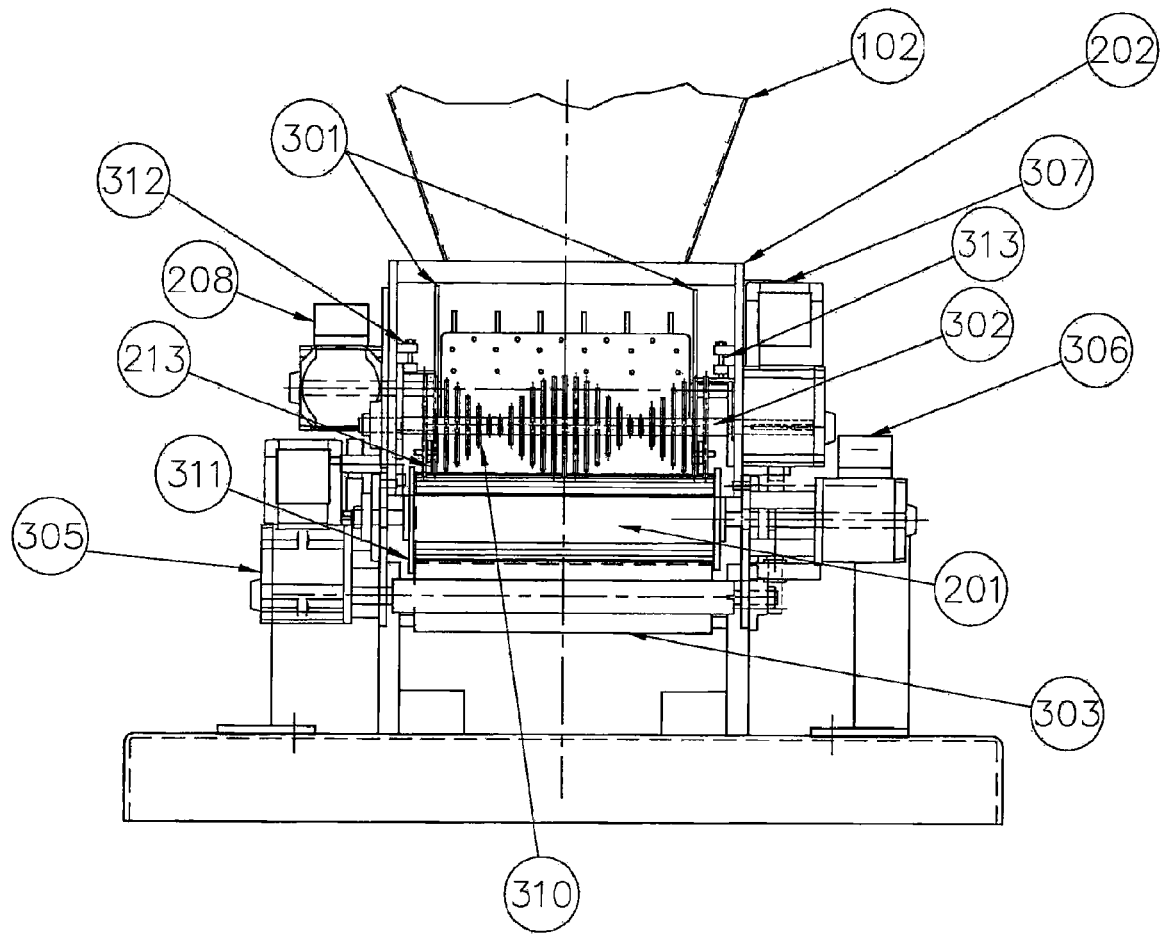
FIG. 2B is a close up view of the region 350 of FIG. 2A.

FIG. 2B is a close-up view of the region generally identified by item 350 in FIG. 2A.

Means for creating a substantially predetermined height and width of material may comprise items 208, 209, 301 and one or both of 206 and 207.

Various features of the system may be implemented in hardware, software, or a combination of hardware and software. For example, some features of the system may be implemented in computer programs executing on programmable computers. Each program may be implemented in a high level procedural or object-oriented programming language to communicate with a computer system or other machine. Furthermore, each such computer program may be stored on a storage medium such as read-only-memory (ROM) readable by a general or special purpose programmable computer or processor, for configuring and operating the computer to perform the functions described above. Moreover, various implementations of the metering mechanism may be employed with a weighing mechanism to construct a weight-loss feeder. Such implementations enable a user to determine the precise amount of material metered and/or fed through the apparatus.

A number of implementations have been described. Nevertheless, it will be understood that various modifications may be made without departing from the spirit and scope of the invention. Accordingly, other embodiments are within the scope of the following claims.

What is claimed is:

1. A system for conveying a fibrous or strand-type material comprising:
   a hopper for storing a fibrous or strand-type material, the hopper having a first opening for receiving material and a second opening for releasing material;
   a first rotatable pulley having a diameter and a width;
   a movable belt, coupled to the first rotatable pulley, having a length and a width, the belt disposed below the second opening of the hopper, an upper surface of the belt being adjacent to the second opening of the hopper and arranged to move material that has been released through the second opening of the hopper, wherein the upper surface of the belt is located in its entirety outside and below the hopper with a gap between the second opening of the hopper and the upper surface of the belt;
   a belt motor to move the upper surface of the belt in a first direction;
   a first rotating drum disposed above the upper surface of the belt, the first rotating drum comprising one or more projections having a preselected length and being coupled directly on one end to the outside periphery of the first rotating drum, wherein the shortest distance from the outside periphery of the first rotating drum to the upper surface of the belt is a first predetermined distance, the first rotating drum substantially limiting the travel of material on the upper surface of the belt higher than the first predetermined distance; and
   a rotating shaft, located a distance from the first rotating drum in the first direction, the rotating shaft being disposed above the upper surface of the belt and proximate to a discharge point, the rotating shaft comprising one or more flow smoothing pickers having preselected lengths, being coupled on one end to the outside periphery of the rotating shaft and being arranged in a spiraling configuration directed toward the center of the belt.

2. The system of claim 1 comprising a second rotating drum, located a distance from the first rotating drum in the first direction, the second rotating drum being disposed above the upper surface of the belt and comprising one or more second projections having a preselected length and being coupled on one end to the outside periphery of the second rotating drum.

3. The system of claim 2 wherein the second rotating drum is configured to rotate in a direction the same as the first rotating drum.

4. The system of claim 2 wherein the shortest distance from the outside periphery of the second rotating drum to the upper surface of the belt is a second predetermined distance, the second rotating drum substantially limiting the travel of material on the upper surface of the belt higher than the second predetermined distance.

5. The system of claim 4 wherein the second predetermined distance is the same as the first predetermined distance.

6. The system of claim 1 wherein the rotating shaft is configured to rotate in the opposite direction of the first rotating drum.

7. The system of claim 1 comprising a rotating wiper assembly, located a distance from the first rotating drum in the first direction, the rotating wiper being disposed below the lower surface of the belt and comprising at least one projection that substantially contacts the lower surface of the belt.

8. The system of claim 7 wherein the rotating wiper assembly is configured to rotate in the same direction as the first rotating drum.

9. The system of claim 1 comprising a threaded shaft coupled to the first rotating drum, wherein the first predetermined distance is adjusted by rotating the threaded shaft.

10. The system of claim 4 comprising a threaded shaft coupled to the second rotating drum, wherein the second predetermined distance is adjusted by rotating the threaded shaft.

11. The system of claim 1 comprising a threaded shaft coupled to the rotating shaft, wherein the distance from the rotating shaft to the upper surface of the belt is adjusted by rotating the threaded shaft.

12. The system of claim 1 comprising two or more belt side guides spaced apart and substantially perpendicular to the upper surface of the belt and aligned substantially parallel along a portion of the length of the belt, wherein the two or more guides control the width of material on the upper surface of the belt.

13. The system of claim 12 comprising two belt guides spaced by a distance that is less than the width of the belt.

14. The system of claim 1 further comprising a hopper discharge spout with a back end that is substantially solid to prevent the material that is released from the hopper onto the upper surface of the belt from spilling off the upper surface of the belt, and a front end that is substantially open to allow substantially unrestricted flow of the material that is released from the hopper onto the upper surface of the belt.

15. The system of claim 14 wherein the hopper discharge has a cross-section that is a "c"—shaped half-circle or a "v"—shaped open triangle.

16. The system of claim 1 wherein all of the walls of the hopper that contain the material are stationary.

17. The system of claim 1 further comprising fibrous or strand-type material in the hopper.

18. The system of claim 1 wherein the hopper and belt are arranged such that the material in the hopper can flow substantially under the influence of gravity through the second opening and onto the upper surface of the belt.

19. A system for conveying a fibrous or strand-type material comprising:
   a hopper for storing a fibrous or strand-type material, the hopper having a first opening for receiving the fibrous or strand-type material and a second opening for releasing the fibrous or strand-type material;

a first rotatable pulley having a diameter and a width;

a movable belt, coupled to the first rotatable pulley, having a length and a width, the belt disposed below the second opening of the hopper and separated from the second opening of the hopper by a gap, an upper surface of the belt being adjacent to the second opening of the hopper and arranged to move the fibrous or strand-type material that has been released through the second opening of the hopper, wherein the upper surface of the belt is located in its entirety outside and below the hopper;

a belt motor to move the upper surface of the belt in a first direction; and a first rotating drum disposed above the upper surface of the belt, the first rotating drum comprising one or more projections having a preselected length and being coupled directly on one end to the outside periphery of the first rotating drum, wherein the shortest distance from the outside periphery of the first rotating drum to the upper surface of the belt is a first predetermined distance, the first rotating drum substantially limiting the travel of the fibrous or strand-type material on the upper surface of the belt higher than the first predetermined distance;

a second rotating drum, located a distance from the first rotating drum in the first direction, the second rotating drum disposed above the upper surface of the belt and comprising one or more second projections having a preselected length and being coupled on one end to the outside periphery of the second rotating drum, wherein the shortest distance from the outside periphery of the second rotating drum to the upper surface of the belt is a second predetermined distance, the second rotating drum substantially limiting the travel of the fibrous or strand-type material on the upper surface of the belt higher than the second predetermined distance; and a rotating shaft, located a distance from the second rotating drum in the first direction, the rotating shaft being disposed above the upper surface of the belt and proximate to a discharge point, the rotating shaft comprising one or more flow smoothing pickers having preselected lengths, being coupled on one end to the outside periphery of the rotating shaft and being arranged in a spiraling configuration directed toward the center of the belt, wherein the second rotating drum is configured to rotate in a direction the same as the first rotating drum.

20. The system of claim 19 further comprising a hopper discharge spout with a back end that is substantially solid to prevent the material that is released from the hopper onto the upper surface of the belt from spilling off the upper surface of the belt, and a front end that is substantially open to allow substantially unrestricted flow of the material that is released from the hopper onto the upper surface of the belt.

21. The system of claim 20 wherein the hopper discharge spout has a cross-section that is a "c"—shaped half-circle or a "v"—shaped open triangle.

22. The system of claim 19 wherein all of the walls of the hopper that contain the material are stationary.

23. The system of claim 19 further comprising fibrous or strand-type material in the hopper.

24. The system of claim 23 wherein the fibrous or strand-type material have strand lengths between about 0.125 inches and about 1.5 inches.

25. The system of claim 19 wherein the hopper and belt are arranged such that the material in the hopper can flow substantially under the influence of gravity through the second opening and onto the upper surface of the belt.

26. The system of claim 19 wherein the upper surface of the belt extends from the first rotatable pulley to a second rotatable pulley and across the width of the belt from a first edge of the belt to a second edge of the belt.

27. The system of claim 1 wherein the upper surface of the belt extends from the first rotatable pulley to a second rotatable pulley and across the width of the belt from a first edge of the belt to a second edge of the belt.

\* \* \* \* \*